(12) United States Patent
Noguchi

(10) Patent No.: US 6,462,843 B2
(45) Date of Patent: *Oct. 8, 2002

(54) IMAGE PROCESSING APPARATUS, AND PROCESSING METHOD IN THE IMAGE PROCESSING APPARATUS

(75) Inventor: Junichi Noguchi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/126,388

(22) Filed: Jul. 30, 1998

(65) Prior Publication Data

US 2001/0026378 A1 Oct. 4, 2001

(30) Foreign Application Priority Data

Jul. 30, 1997 (JP) ............................................. 9-204476

(51) Int. Cl.⁷ ................................................. H04N 1/04
(52) U.S. Cl. ......................... 358/498; 358/494; 358/501
(58) Field of Search ................................. 358/501, 505, 358/509, 523, 524, 528, 494, 498, 474; 382/321, 312, 315; 355/25, 82

(56) References Cited

U.S. PATENT DOCUMENTS

| | | | | |
|---|---|---|---|---|
| 4,449,152 A | * | 5/1984 | Kurata et al. | 358/296 |
| 5,132,787 A | * | 7/1992 | Omi et al. | 358/78 |
| 5,481,365 A | * | 1/1996 | Arimoto | 358/296 |
| 5,751,446 A | * | 5/1998 | Fujioka | 358/474 |
| 5,798,841 A | * | 8/1998 | Takahashi | 358/296 |

* cited by examiner

Primary Examiner—Thomas D. Lee
(74) Attorney, Agent, or Firm—Fitzpatrick, Cella, Harper & Scinto

(57) ABSTRACT

Images are efficiently formed from a plurality of originals at a high speed. A first original and a second original simultaneously disposed on an original-mount are scanned by relative movement of an illuminating unit with respect to the first original and the second original. An image corresponding to the first original is borne at forward scanning with respect to the original-mount, and an image corresponding to the second original is borne at backward scanning with respect to the original-mount. An image corresponding to the first image and an image corresponding to the second image are formed on a first recording medium and a second recording medium, respectively. An image signal corresponding to the second original is sequentially stored in a storage medium in accordance with the scanning. The stored image signal is read from the storage medium in a sequence reverse to a sequence of the storage.

21 Claims, 14 Drawing Sheets

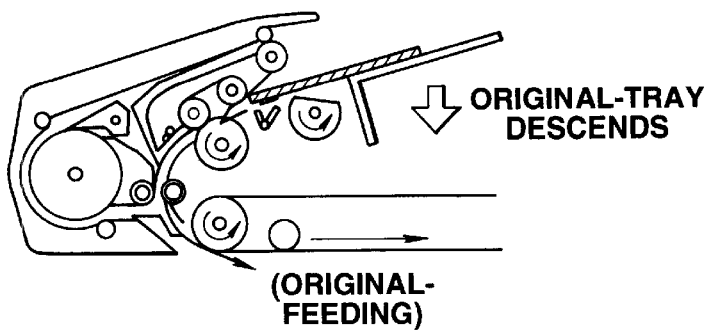
FIG.2(a) ORIGINAL-TRAY DESCENDS (ORIGINAL-FEEDING)
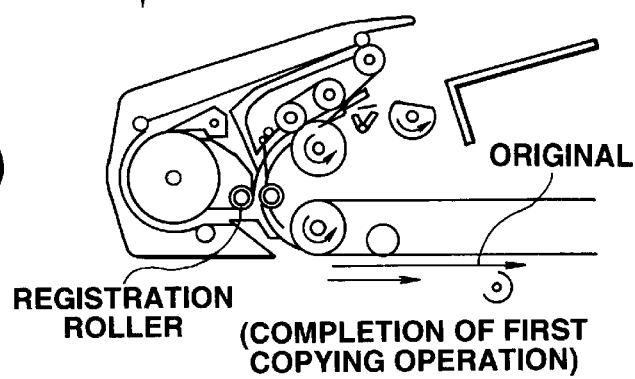
FIG.2(b) REGISTRATION ROLLER — ORIGINAL (COMPLETION OF FIRST COPYING OPERATION)
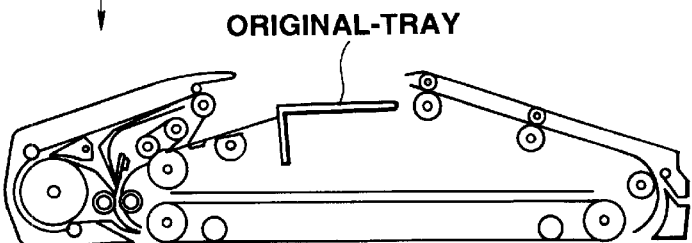
FIG.2(c) ORIGINAL-TRAY — OPTICAL SYSTEM ADVANCES — ORIGINAL (CONVEYANCE)
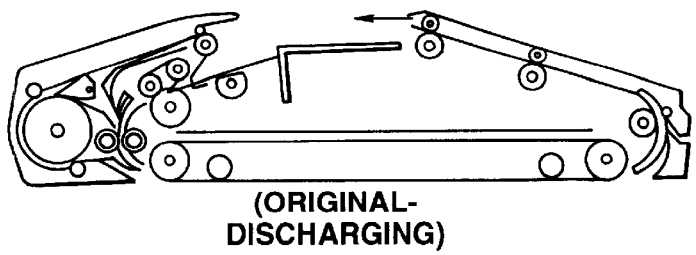
FIG.2(d) (ORIGINAL-DISCHARGING)

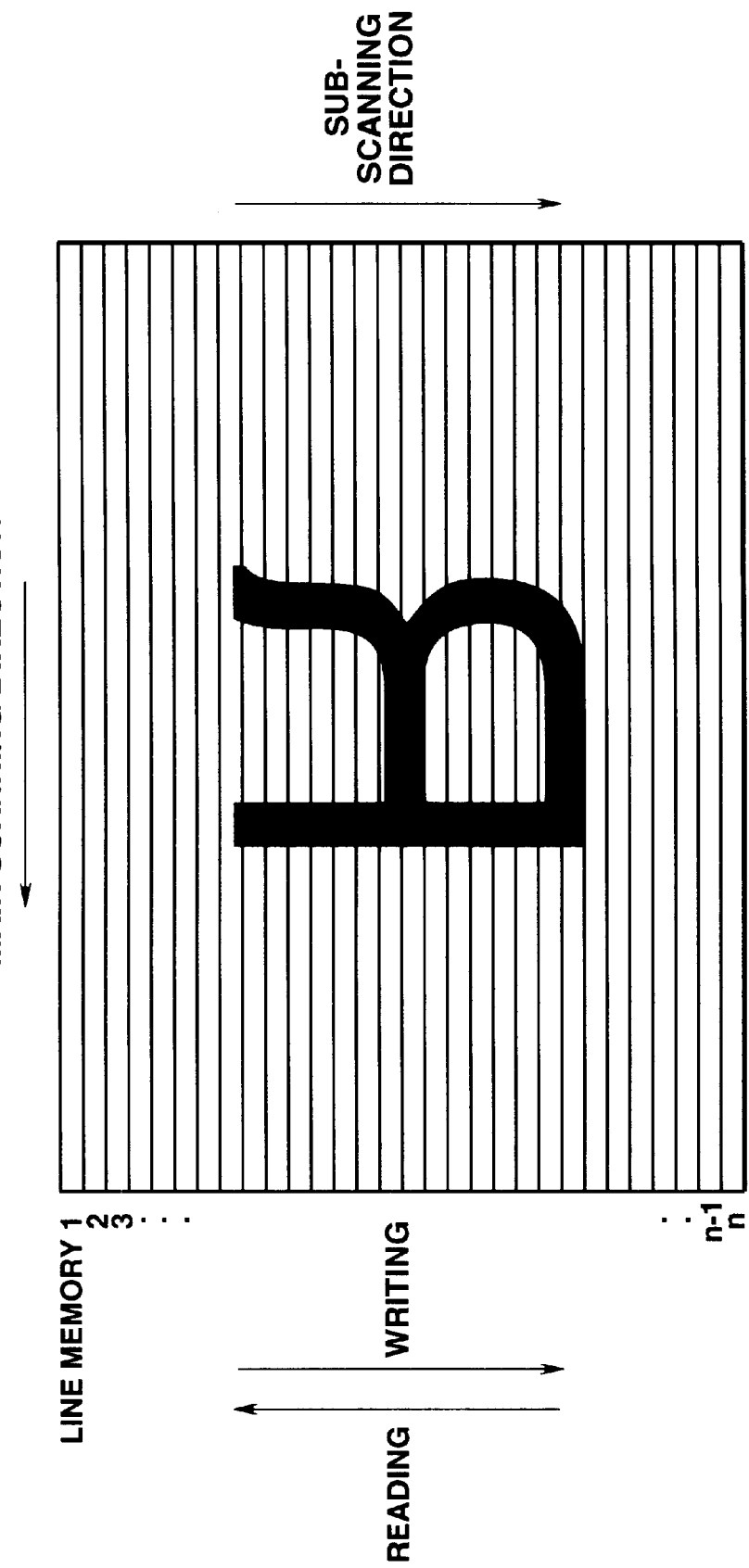

IMAGE PROCESSING APPARATUS, AND PROCESSING METHOD IN THE IMAGE PROCESSING APPARATUS

BACKGROUND OF THE INVENTION

1. Field of the Invention

The present invention relates to an image processing apparatus, and a processing method in the image processing apparatus.

2. Description of the Related Art

In conventional color-image processing apparatuses, such as digital color copiers and the like, an image signal obtained by reading an image with a reading unit is electrically processed and decomposed into magenta (M), cyan (C), yellow (Y) and black (BK) components, which are transmitted to a printer unit. One of the M, C, Y and BK components is transmitted to the printer unit at one reading operation (original-scanning). Hence, one printout is completed by four original-scanning operations.

M, C, Y and BK electrostatic latent images are formed on a photosensitive drum at respective original-scanning operations, and each of the electrostatic latent images is developed using a toner corresponding thereto. Four, i.e., M, C, Y and BK, toner images developed on the photosensitive drum are transferred onto a copy sheet by winding the sheet around a transfer drum and rotating the transfer drum four times. That is, one printout is obtained by four rotations of the transfer drum.

The transfer drum has a size to allow to wind a maximum-size copy sheet (for example, an A3-size sheet) therearound. Two sheets having a size half the maximum size (for example, A4-size sheets) can be wound around the transfer drum. Hence, when obtaining a plurality of copies from one original using such sheets, two such sheets are wound around the transfer drum. That is, two copies can be obtained by four rotations of the transfer drum, so that productivity is increased. For example, when obtaining a plurality of copies from one original using A4- or B5-size copy sheets, two copies can be obtained by winding two such copy sheets around the transfer drum and performing four rotations of the transfer drum.

However, when obtaining copies of a plurality of originals, since the image reading speed cannot follow the speed of the recording operation including development of images on the photosensitive drum and transfer of the developed images onto a copy sheet, the image of each of the originals is read while winding only one copy sheet around the transfer drum. Accordingly, the rotation time of the transfer drum for a region where a copy sheet is not wound (corresponding to one A4-size original) is a wasteful time which is not used for a copying operation, resulting in an increase in the copying process time.

SUMMARY OF THE INVENTION

It is an object of the present invention to solve the above-described problems.

It is another object of the present invention to provide an image processing apparatus and method which can realize efficient reading of an image and thereby to realize high-speed image formation.

It is still another object of the present invention to provide an image processing apparatus and a processing method in the image processing apparatus having new functions.

According to one aspect, the present invention which achieves these objectives relates to an image processing apparatus for forming a color image on a recording medium. The apparatus includes an optical unit for scanning and exposing an original, moving means for causing the optical unit to perform reciprocating scanning, image reading means for reading a reflected image obtained by scanning and exposing the original, conversion means for converting read image data into a digital signal, storage means for storing converted digital image data, control means for performing control so that a scanning start position of the optical unit is set at a division portion between two originals on an original-mount, that an operation of reading one of the originals by the image reading means based on the scanning start portion is performed during a forward movement of the optical unit, and that an operation of reading the other original by the image reading means is performed during a backward movement of the optical unit, and reading means for reading image data read in the backward movement in a sequence reverse to a sequence to write the image data in the storage means.

According to another aspect, the present invention which achieves these objectives relates to an image processing apparatus including reading means for scanning a first original and a second original simultaneously disposed on an original-mount by relative movement of an illuminating unit with respect to the first original and the second original, bearing means for simultaneously bearing a first image corresponding to the first original and a second image corresponding to the second original read by the reading means, and forming means for forming an image corresponding to the first image and an image corresponding to the second image on a first recording medium and a second recording medium, respectively. The bearing means bears the image corresponding to the first original during a reading operation of the reading means at a forward movement with respect to the original-mount, and bears the image corresponding to the second original during a reading operation of the reading means at a backward movement with respect to the original-mount.

According to still another aspect, the present invention which achieves these objectives relates to a processing method in an image processing apparatus. The method includes the steps of scanning a first original and a second original simultaneously disposed on an original-mount by relative movement of an illuminating unit with respect to the first original and the second original, bearing an image corresponding to the first original at forward scanning with respect to the original-mount, bearing an image corresponding to the second original at backward scanning with respect to the original-mount, and forming an image corresponding to the first image and an image corresponding to the second image on a first recording medium and a second recording medium, respectively.

The foregoing and other objects, advantages and features of the present invention will become more apparent from the following description of the preferred embodiments taken in conjunction with the accompanying drawings.

BRIEF DESCRIPTION OF THE DRAWINGS

FIGS. 2(a) through 2(d) are diagrams illustrating the operational principle of an original-feeding device (DF (document feeder));

FIG. 15 is a diagram illustrating a manner of writing/reading an image into/from a storage medium in the first embodiment.

DESCRIPTION OF THE PREFERRED EMBODIMENTS

First Embodiment

A first preferred embodiment of the present invention will now be described with reference to the drawings.

Figure 1:
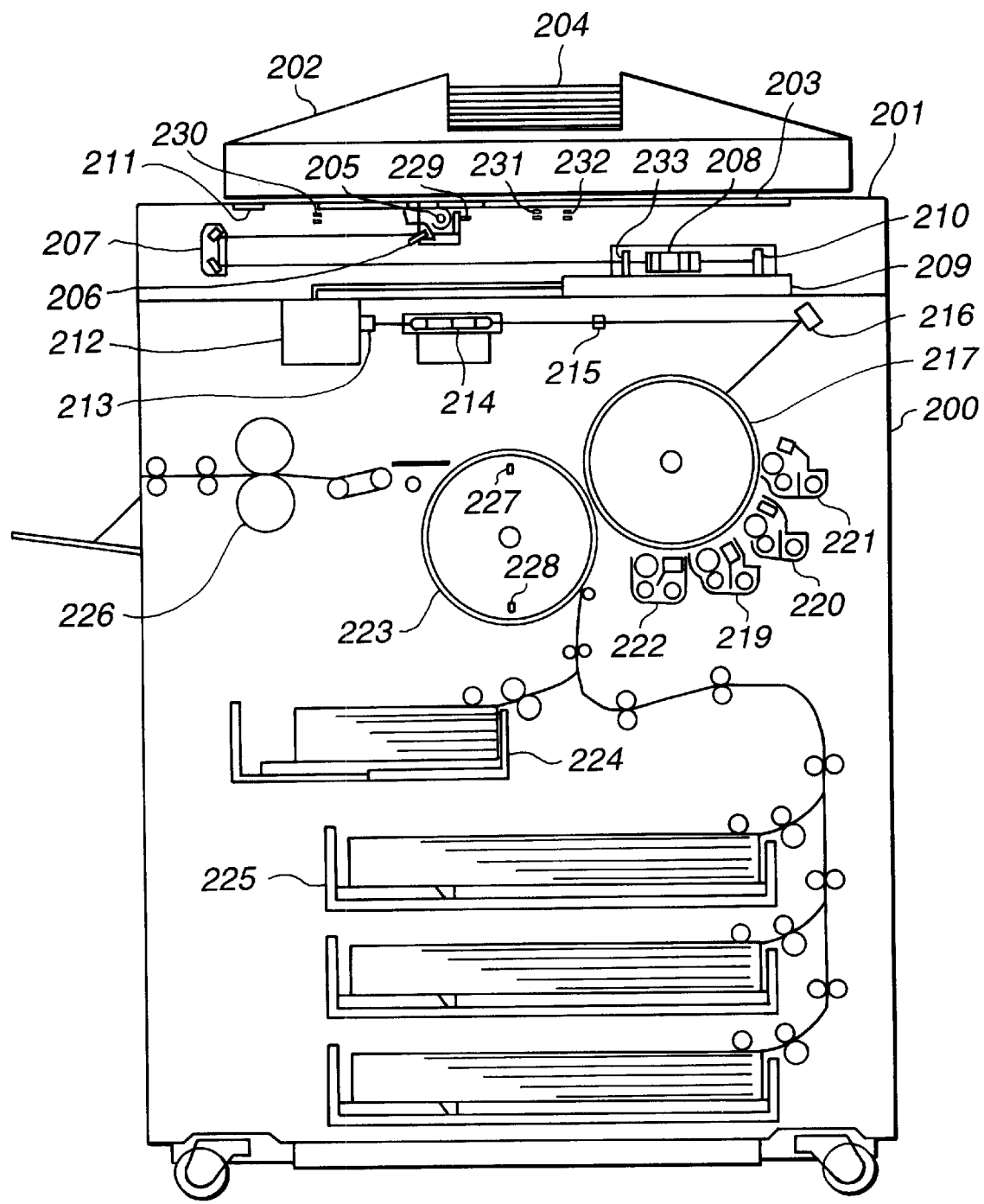
FIG. 1 is a diagram illustrating the configuration of a color copier.

FIG. 1 is a diagram illustrating an external appearance of an apparatus according to the first embodiment.

In FIG. 1, an image scanner unit 201 reads an original and performs digital signal processing for the obtained data. A printer unit 200 prints a full-color image corresponding to the image of the original read by the image scanner 201 on a sheet.

In the image scanner unit 201, an original-feeding device (DF) 202 sets one of originals 204 mounted thereon onto original-mount glass 203. The original 204 on the original-mount glass 203 is illuminated by light from a halogen lamp 205. Reflected light from the original 204 is guided to mirrors 206 and 207, and an image is formed on a 3-line sensor (hereinafter termed a "CCD (charge-coupled device)") 210 by a lens 208. A far-infrared-cut filter 233 is provided in front of the lens 208.

The CCD 210 performs color decomposition of light information from the original 204 to provide full-color information comprising red (R), green (G) and blue (B) components, and transmits the information to a signal processing unit 209. The halogen lamp 205 and the mirror 206, and the mirror 207 mechanically move at a speed v and at a speed ½ v, respectively, in a direction (hereinafter termed a "sub-scanning direction") perpendicular to an electrical scanning direction (hereinafter termed a "main scanning direction"), in order to scan the entire surface of the original 204 by performing relative movement with respective to the original 204.

Figure 3:
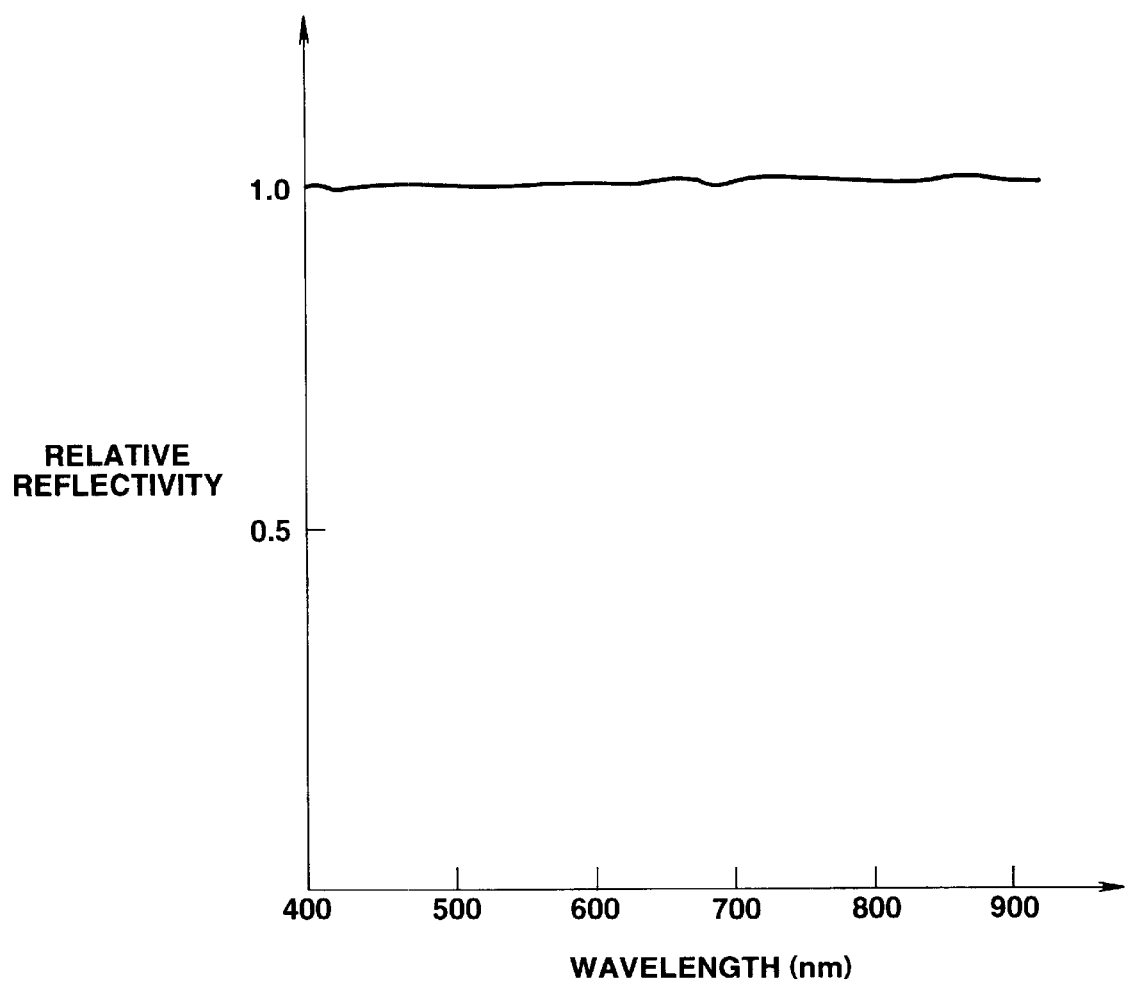
FIG. 3 is a graph illustrating a spectral reflectivity of a white plate.

A standard white plate 211 generates correction data for data read by an R sensor 210-1, a G sensor 210-2 and a B sensor 210-3. As shown in FIG. 3, this standard white plate has a substantially uniform reflectivity in a range of visible light and infrared light, and is observed as white. Output data of the R sensor 210-1, the G sensor 210-2 and the B sensor 210-3 are corrected using this standard white plate. Optical sensors 230, 231 and 232 produce image-distal-end signals VTOPA, VTOPB and VTOPC, respectively, in cooperation with a flag plate 229.

The signal processing unit 209 electrically processes read R, G and B signals to decompose these signals into magenta (M), cyan (C), yellow (Y) and black (BK) components, which are transmitted to the printer unit 200. One of the M, C, Y and BK components is transmitted to the printer unit 200 at each original-scanning operation in the image scanner unit 201, and one printout is completed by four original-scanning operations.

In the printer unit 200, the M, C, Y and BK image signals transmitted from the image scanner unit 201 are transmitted to a laser driver 212. The laser driver 212 performs modulation driving of a semiconductor laser 213 in accordance with the M, C, Y and BK image signals. A laser beam from the semiconductor laser 213 scans a photosensitive drum 217 via a polygonal mirror 214, an f-θ lens 215 and a mirror 216. Four developing units, i.e., a magenta developing unit 219, a cyan developing unit 220, a yellow developing unit 221 and a black developing unit 222, sequentially contact the photosensitive drum 217, in order to develop M, C, Y and BK electrostatic latent images formed on the photosensitive drum 217 with corresponding toners. A sheet fed from a sheet cassette 224 or 225 is wound around a transfer drum 223. A developed toner image on the photosensitive drum 217 is transferred onto the sheet. Two A4-size sheets (one A3-size sheet) can be wound around the transfer drum 223. The transfer drum 223 incorporates two sensors 227 and 228 in order to adjust the position of the leading edge of each of two A4-size sheets with the leading edge of a latent image on the photosensitive drum 217. After sequentially transferring four, i.e., M, C, Y and BK, images, the sheet is discharged after passing through a fixing unit 226.

FIGS. 2(a)–2(d) are diagrams illustrating the original-feeding operation of the original-feeding device (DF) shown in FIG. 1: FIG. 2(a) corresponds to an original-feeding state; FIG. 2(b) corresponds to the state of completion of a first copying operation; FIG. 2(c) corresponds to an original-conveying state; and FIG. 2(d) corresponds to an original-discharging state. When an original on an original-tray has been fed (FIG. 2(a)), the original-feeding device (DF) 202 sets the original on the original-mount glass 203. After detecting and copying the original (FIG. 2(b)), the original on the original-mount glass 203 is conveyed (FIG. 2(c)), and is discharged onto the original-tray (FIG. 2(d)).

Next, the image scanner 201 will be described in detail. The halogen lamp 205, serving as an original-illuminating light source, is used for reading visible information, and provides wavelength components necessary for reading the information.

Figure 4A:
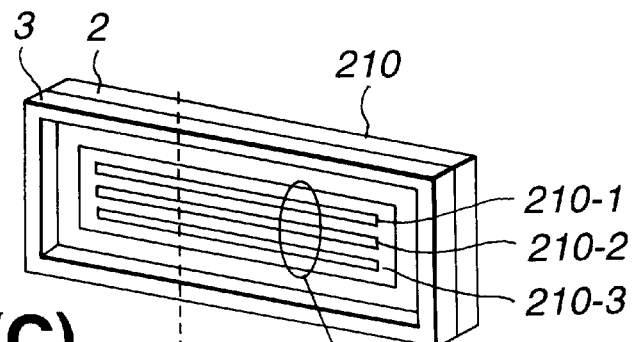
FIGS. 4(A) through 4(C) are diagrams illustrating the structure of a 3-line color sensor.

FIG. 4(A) illustrates the configuration of the CCD 210 used in the first embodiment. In FIG. 4(A), there are shown photosensor rows 210-1, 210-2 and 210-3 for reading R, G and B wavelength components, respectively. As shown in FIG. 4(B), the R. G and B photosensor rows 210-1, 210-2 and 210-3 have apertures 10 μm wide both in the main scanning direction and the sub-scanning direction. The photosensor rows 210-1, 210-2 and 210-3 having different optical characteristics are monolithically formed on the same silicon chip so as to be parallel to each other in order to read the same line of an original. By using the CCD 210 having this configuration, it is possible to use a common optical system, comprising a lens and the like, for performing color-decomposition reading, and thereby to simplify optical adjustment for R, G and B.

Figure 4C:
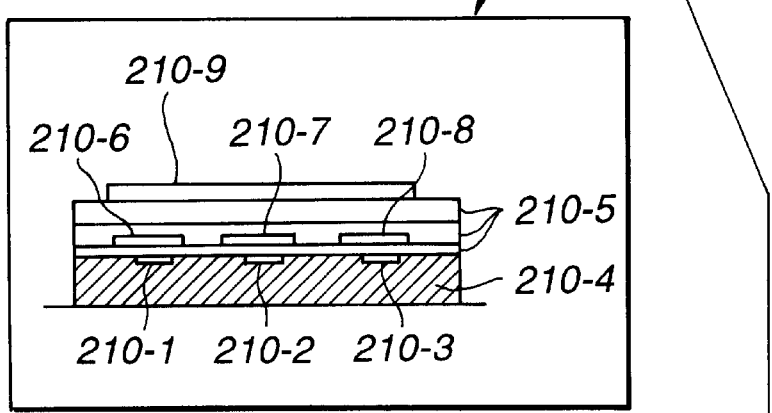
Figure 4B:
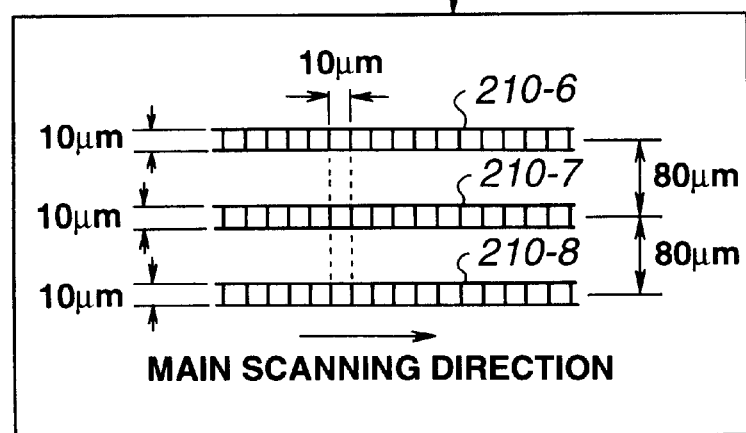

FIG. 4(C) is a cross-sectional view taken along a broken line shown in FIG. 4(A). Photosensors 210-1, 210-2 and 210-3 for reading information relating to R, G and B, respectively, are disposed on a silicon substrate 210-4. An R filter 210-6 for transmitting a red wavelength component of visible light is disposed on the R photosensor 210-1. Similarly, a G filter 210-7 and a B filter 210-8 are disposed on the G photosensor 210-2 and the B photosensor 210-3, respectively.

The spectral characteristics of the R, G and B photosensors of the CCD 210 will now be described with reference to FIG. 5. A characteristic represented by R is the output characteristic of the R photosensor 210-1 having the R filter 210-6. The R photosensor 210-1 is sensitive to light in the red and infrared wavelength regions. A characteristic represented by G is the output characteristic of the G photosensor 210-2 having the G filter 210-7. The G photosensor 210-2 is sensitive to light in the green and infrared wavelength regions. A characteristic represented by B is the output characteristic of the B photosensor 210-3 having the B filter 210-8. The B photosensor 210-3 is sensitive to light in the blue and infrared wavelength regions.

Figure 5:
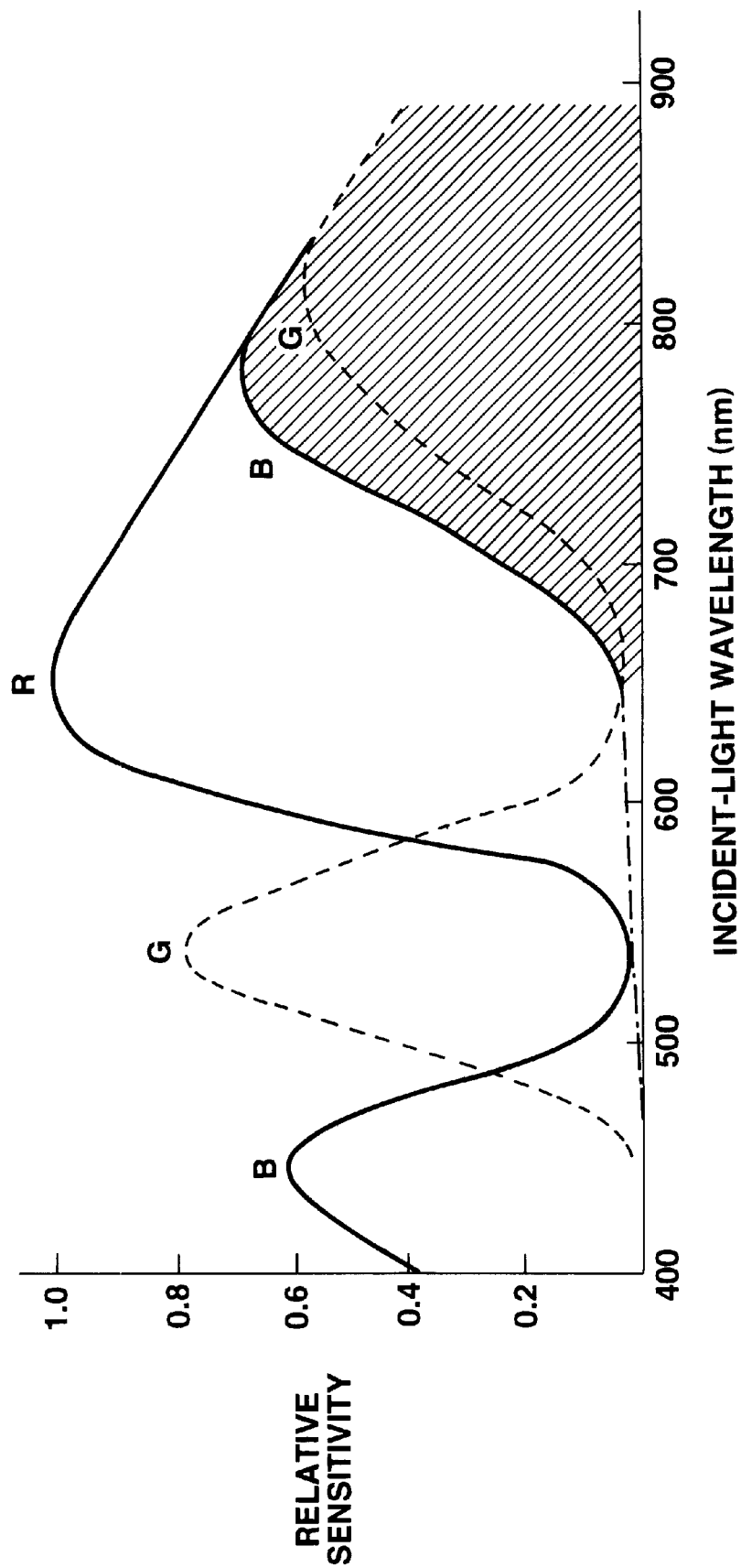
FIG. 5 is a graph illustrating spectral sensitivity characteristics of a visual line sensor.
Figure 6:
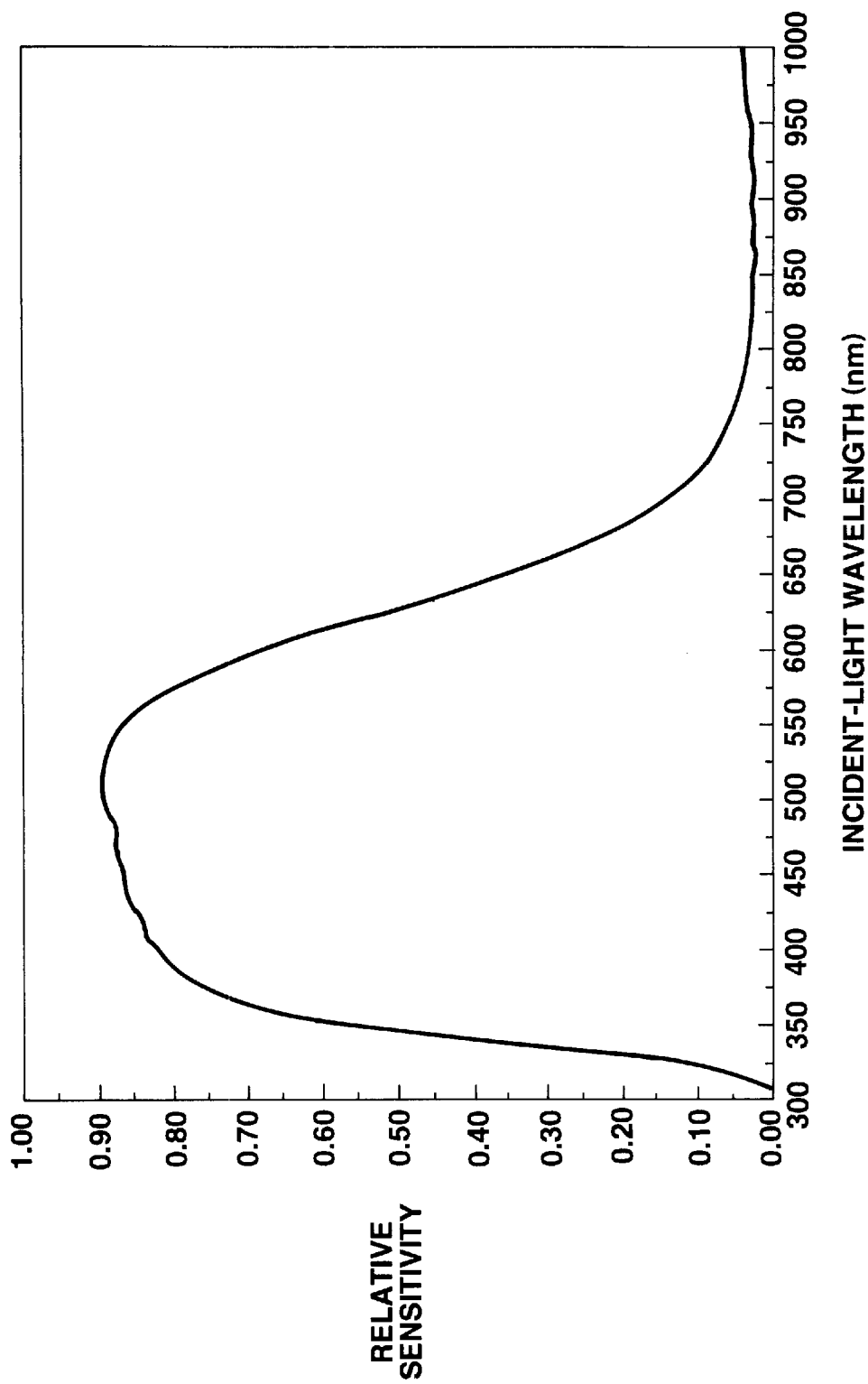
FIG. 6 is a graph illustrating a characteristic of an infrared-cut filter.

As can be understood from FIG. 5, the R, G and B filters 210-6, 210-7 and 210-8 are sensitive to infrared light having wavelengths larger than 700 nm. Accordingly, a filter 210-9 for cutting infrared light is provided for the R, G and B photosensors 210-1, 210-2 and 210-3. The infrared-cut filter 210-9 comprises laminated vacuum-deposited films of $SiO_2$ and $TiO_2$, and has the characteristic shown in FIG. 6. In FIG. 4(C), there are also shown smoothing layers 210-5 made of transparent organic films.

FIG. 4(B) is an enlarged view of the photosensor rows. Each of the R, G and B sensors has a length of 10 $\mu$m per pixel in the main scanning direction. Sensors for 5,000 pixels are provided in the main scanning direction for each of R, G and B so as to read a shorter side (297 mm) of an A3-size original with a resolution of 400 dpi (dots per inch).

The distance between adjacent rows of the R, G and B photosensor rows is 80 $\mu$m, which equals 8 lines for a 400 lpi (lines per inch) sub-scanning resolution.

Next, a description will be provided of the flow of image signals.

Figure 7:
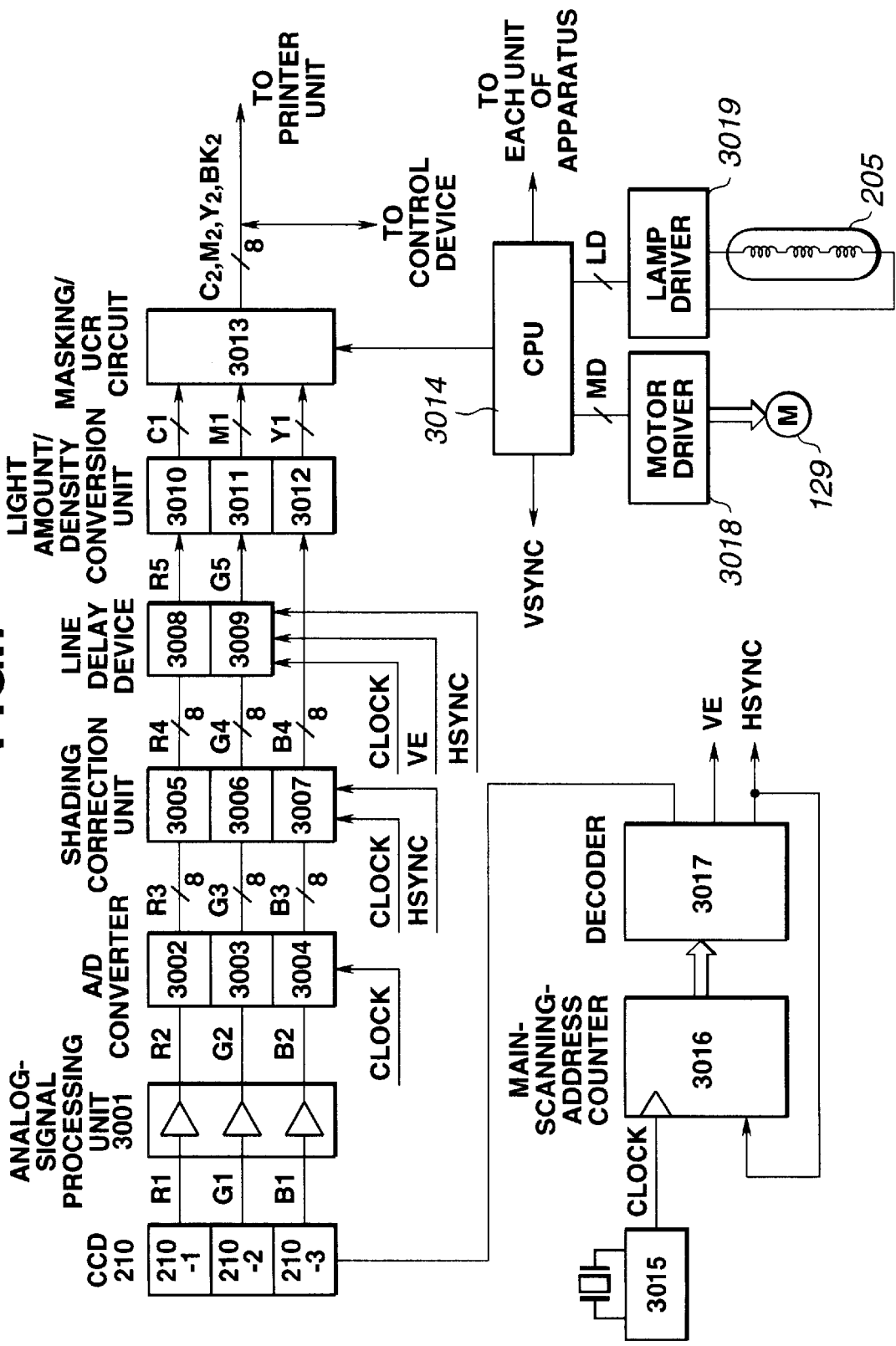
FIG. 7 is a block diagram illustrating an image-signal control unit.

FIG. 7 is a block diagram illustrating the flow of image signals in the image scanner unit 201.

Image signals $R_1$, $G_1$ and $B_1$ output from the CCD 210 are input to an analog-signal processing unit 3001 to be subjected to gain adjustment and offset adjustment. Then, the resultant color signals $R_2$, $G_2$ and $B_2$ are converted into 8-bit digital image signals $R_3$, $G_3$ and $B_3$ by A/D converters 3002, 3003 and 3004, respectively. The color signals $R_3$, $G_3$ and $B_3$ are input to shading correction units 3005, 3006 and 3007, to be subjected to known shading correction using a reading signal from the standard white plate 211 for each of color signals $R_3$, $G_3$ and $B_3$.

A clock-signal generation unit 3015 generates a clock signal in units of a pixel. A main-scanning-address counter 3016 counts clock pulses, and generates a pixel address out-put for one line. A decoder 3017 decodes a main scanning address from the main-scanning-address counter 3016, and generates a CCD driving signal in units of a line, such as shift pulses, reset pulses or the like, a VE signal indicating an effective region in a read signal for one line from the CCD 210, or a line synchronizing signal HSYNC. The value of the main-scanning-address counter 3016 is cleared by the HSYNC signal, in order to start counting of main scanning addresses in the next line.

As shown in FIG. 4(B), since the photosensor rows 210-1, 210-2 and 210-3 of the CCD 210 are disposed with a predetermined distance, the R, G and B sensors read different line positions on an original on the original-mount. Line delay devices 3010, 3011 and 3012 correct spatial deviations in the sub-scanning direction. More specifically, in order to read original-information in a forward direction in the sub-scanning direction with respect to a signal $B_4$, signals $R_4$ and $G_4$ are delayed in the sub-scanning direction by 16 lines and 8 lines, respectively, to be adjusted to the signal $B_4$.

Light amount/density conversion units 3010, 3011 and 3012, each comprising a look-up-table ROM (read-only memory), converts luminance signals $R_5$, $G_5$ and $B_5$ into density signals $C_1$, $M_1$ and $Y_1$, respectively. Although detailed description will be omitted, a known masking/UCR circuit 3013 extracts a black signal (BK) from the input three original-color signals, i.e., $C_1$, $M_1$ and $Y_1$, performs calculation for correcting color turbidity of recording color materials in the printer 212, and sequentially outputs signals $Y_2$, $M_2$, $C_2$ and $BK_2$ having a predetermined bit length, for example, 8 bits, at every reading operation.

A CPU (central processing unit) 3014 performs sequence control, such as control of a motor driver 3018 for driving a motor 129 of an original-reading optical system, control of a lamp driver 3019 for turning on/off the halogen lamp 205, or the like, and generates a signal VSYNC representing a pixel interval in the sub-scanning direction. The CPU 3014 also outputs control signals for controlling the apparatus in accordance with flowcharts to be described later to respective units of the apparatus.

Figure 8:
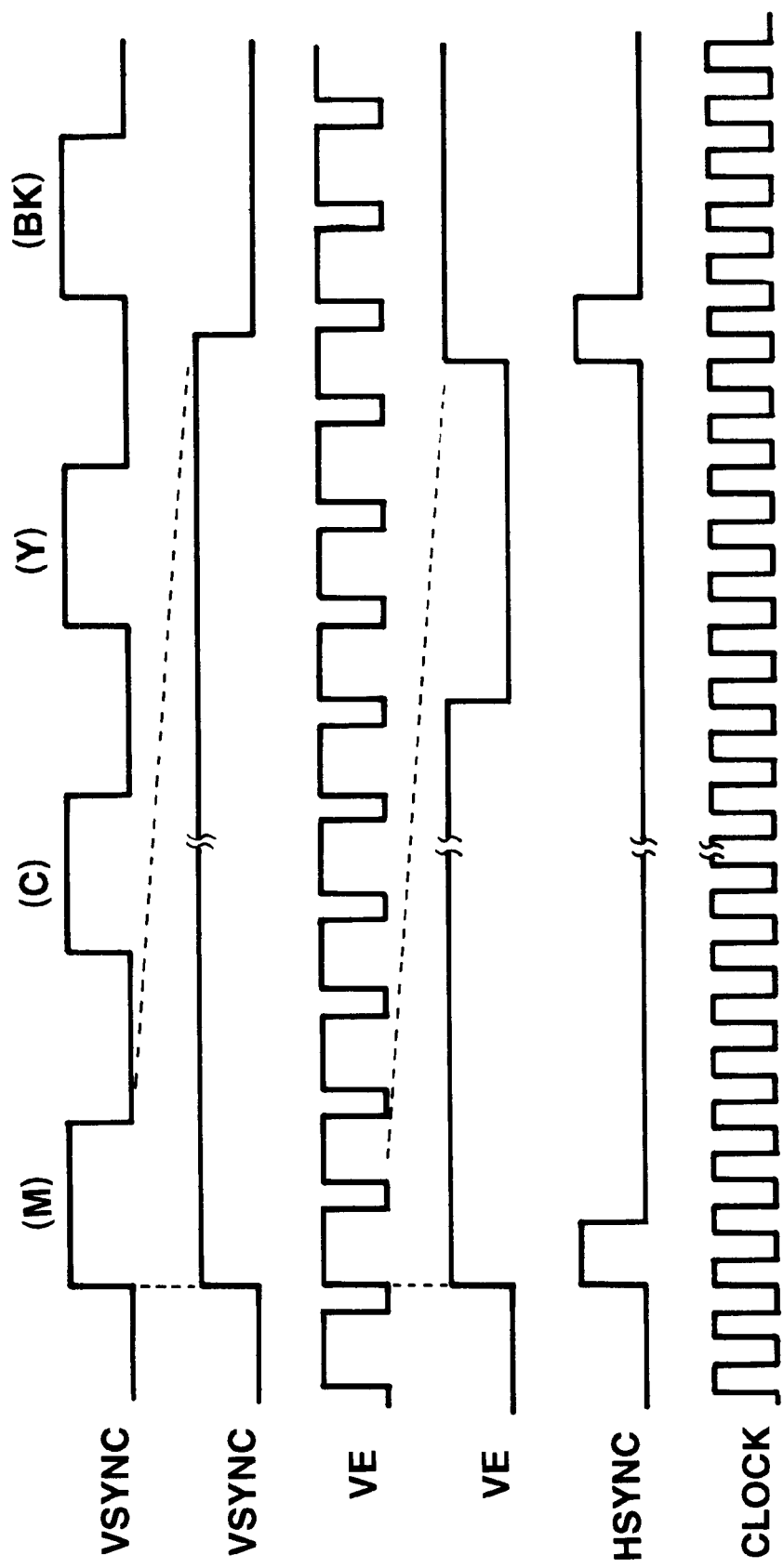
FIG. 8 is a timing chart for an image signal.

FIG. 8 illustrates timings for respective control signals. The signal VSYNC indicates the effective interval of a pixel in the sub-scanning direction, and sequentially forms output signals (C), (M), (Y) and (BK) by performing image reading (scanning) in an interval of logic "1". A signal VE indicates the effective interval of a pixel in the main scanning direction, and provides the timing for a main-scanning start position in an interval of logic "1". The signal VE is mainly used for line counting control in line delay. A signal CLOCK is a pixel synchronizing signal, and transfers image data at the timing of rise from "0" to "1".

Figure 9:
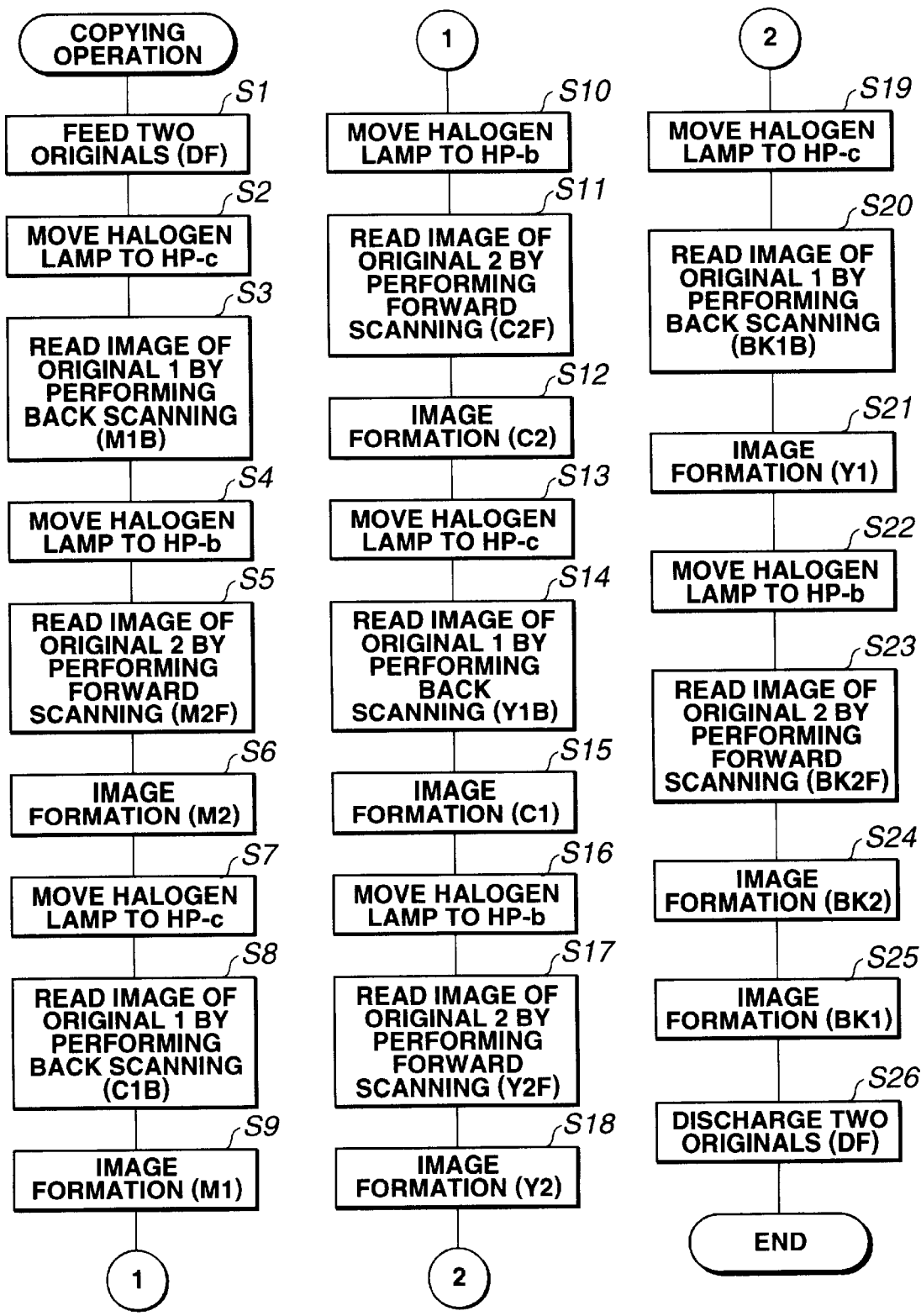
FIG. 9 is a flowchart illustrating the operation in a first embodiment of the present invention.
Figure 10:
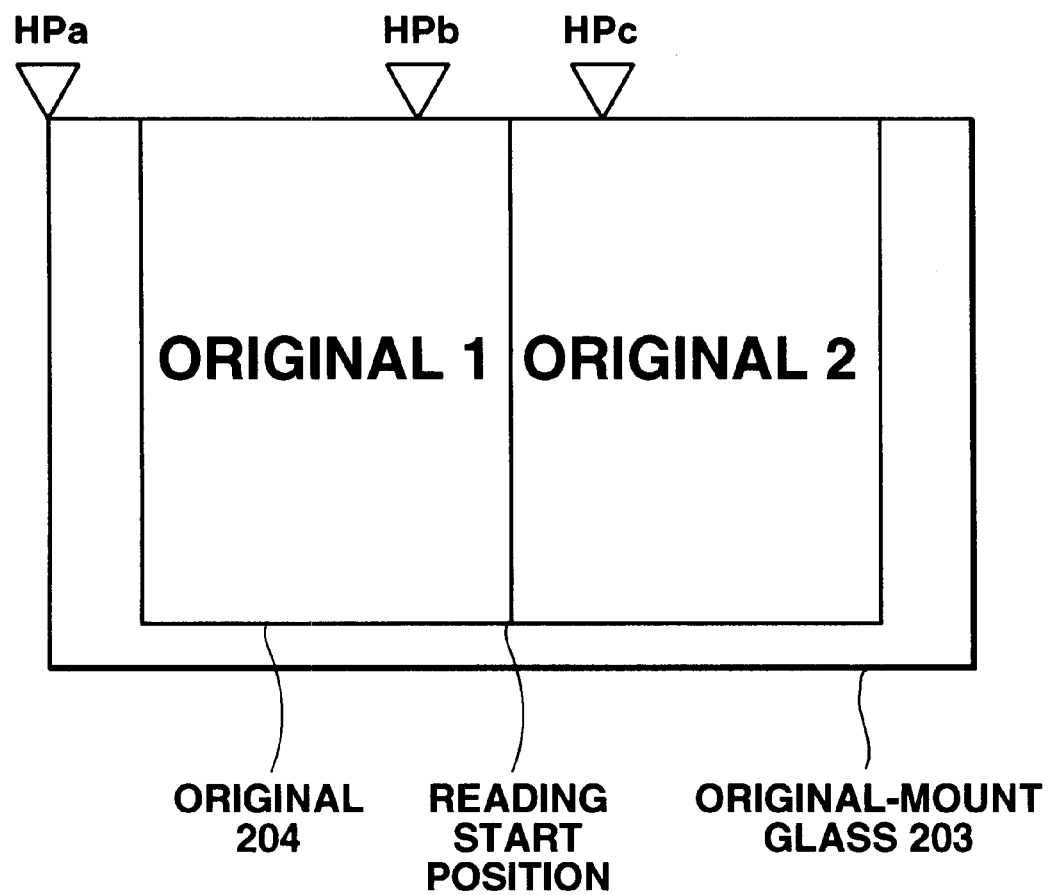
FIG. 10 is a diagram illustrating the home positions of originals on an original-mount.

Next, a description will be provided of the sequence of the apparatus in the first embodiment with reference to the flowchart shown in FIG. 9 and the home positions of respective originals on the original-mount glass 203 shown in FIG. 10. In FIG. 10, symbol HP-a represents the home position of the halogen lamp 205 when a single original is present, symbol HP-b represents the home position of the halogen lamp 205 when reading original 2 when two originals are mounted on the original-mount glass 203, and symbol HP-c represents the home position of the halogen lamp 205 when reading original 1 when two originals are mounted on the original-mount glass 203. The home positions HP-a–HP-c are detected by the sensors 230–232, respectively, when the halogen lamp 205 passes therethrough. The flowchart shown in FIG. 9 will now be described.

The original-feeding device (DF) 202 feeds two of originals mounted thereon to a reading position on the original-mount glass 203 (step S1). On the original-feeding device (DF) 202, originals are sequentially fed from the lowermost original, and original 1 is mounted on original 2. The originals are fed in the sequence of original 2 and original 1. The halogen lamp 205 then moves to the position HP-c (step S2). When the halogen lamp 205 has passed through the optical sensor 232, the speed of the halogen lamp 205 is set to a value v when reading an image before the halogen lamp 205 reaches a reading start position for original 1 while turning on the halogen lamp 205, and the halogen lamp 205 scans original 1 for magenta recording by mechanically moving in a direction to return to the position HP-a in the sub-scanning direction (back scanning) (step S3). At that time, read image data for an A4-size (or a smaller-size) original is stored in a storage medium (not shown).

The halogen lamp 205 then moves to the position HP-b (step S4). When the halogen lamp 205 has passed through the optical sensor 231, the speed of the halogen lamp 205 is set to the value v when reading an image, before the halogen lamp 205 reaches a reading start position for original 2, while turning on the halogen lamp 205, and the halogen lamp 205 scans original 2 for magenta recording by mechanically moving in a direction opposite to the above-described direction in the sub-scanning direction (forward scanning) (step S5). At that time, a magenta image for original 2 corresponding to read image data is formed on the photosensitive drum 217 (step S6).

The halogen lamp 205 then moves to the position HP-c (step S7). When the halogen lamp 205 has passed through the optical sensor 232, the speed of the halogen lamp 205 is set to the value v when reading an image, before the halogen lamp 205 reaches the reading start position for original 1, while turning on the halogen lamp 205, and the halogen lamp 205 scans original 1 for cyan recording by mechanically moving in the direction to return to the position HP-a in the sub-scanning direction (step S8). At that time, read image data for an A4-size (or a smaller-size) original is stored in the storage medium. During this operation, the magenta image data for original 1 which has been stored in the preceding operation is read in a sequence opposite to the sequence when storing the data in the storage medium, and a magenta image is formed on the photosensitive drum 217 (step S9). In this state, the magenta images for originals 1 and 2 are simultaneously formed on the photosensitive drum. The formed images are sequentially transferred onto two sheets on the transfer drum 223.

The halogen lamp 205 then moves to the position HP-b (step S10). When the halogen lamp 205 has passed through the optical sensor 231, the speed of the halogen lamp 205 is set to the value v when reading an image, before the halogen lamp 205 reaches the reading start position for original 2, while turning on the halogen lamp 205, and the halogen lamp 205 scans original 2 for cyan recording by mechanically moving in the direction opposite to the above-described direction in the sub-scanning direction (forward scanning) (step S11). At that time, a cyan image for original 2 corresponding to read image data is formed on the photosensitive drum 217 (step S12).

By performing the above-described operation for each of the colors M, C, Y and BK, the image forming operation is completed (steps S13–S25). Then, the original-feeding device (DF) 202 discharges the original on the original-mount glass 203 (step S26).

Figure 11:
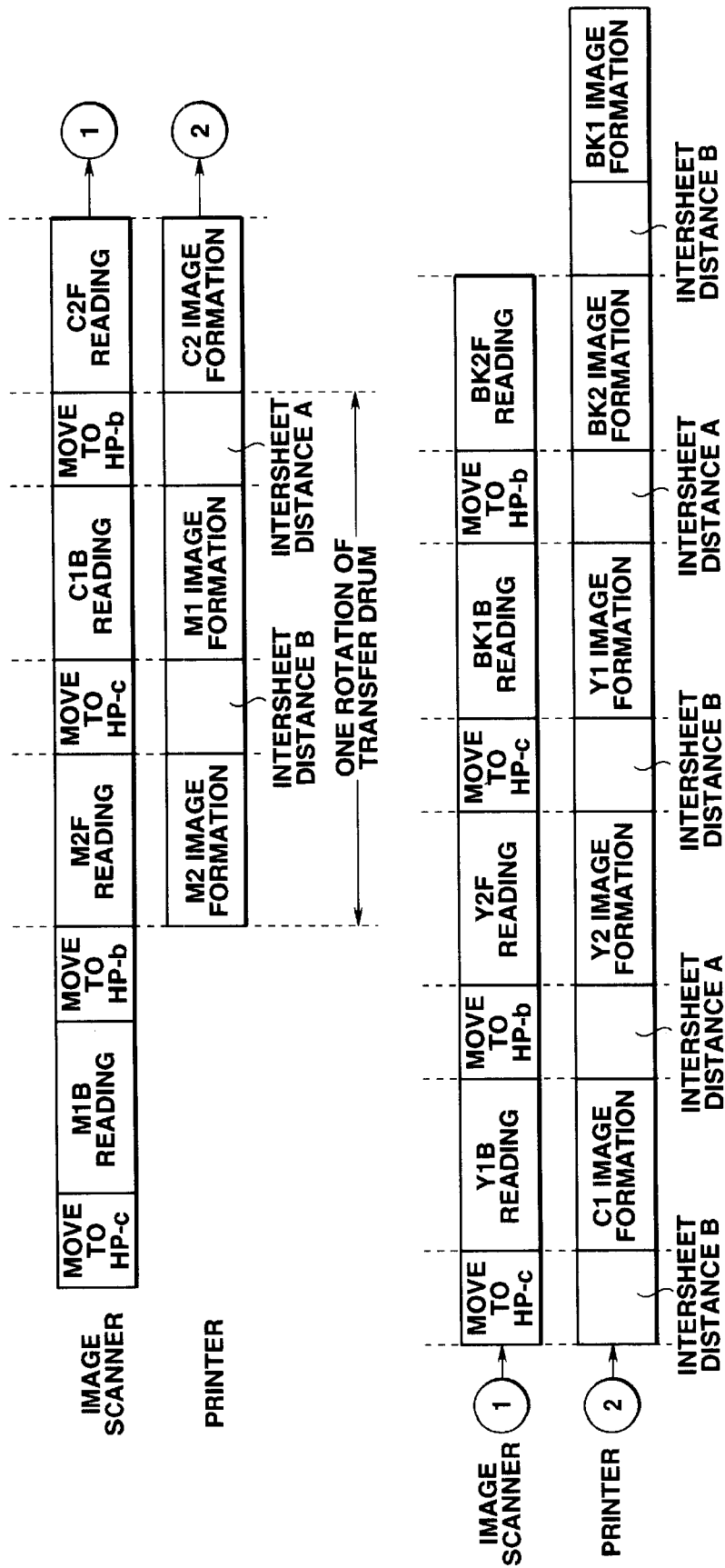
FIG. 11 illustrates timing charts for an image scanner unit and a printer unit.
Figure 12:
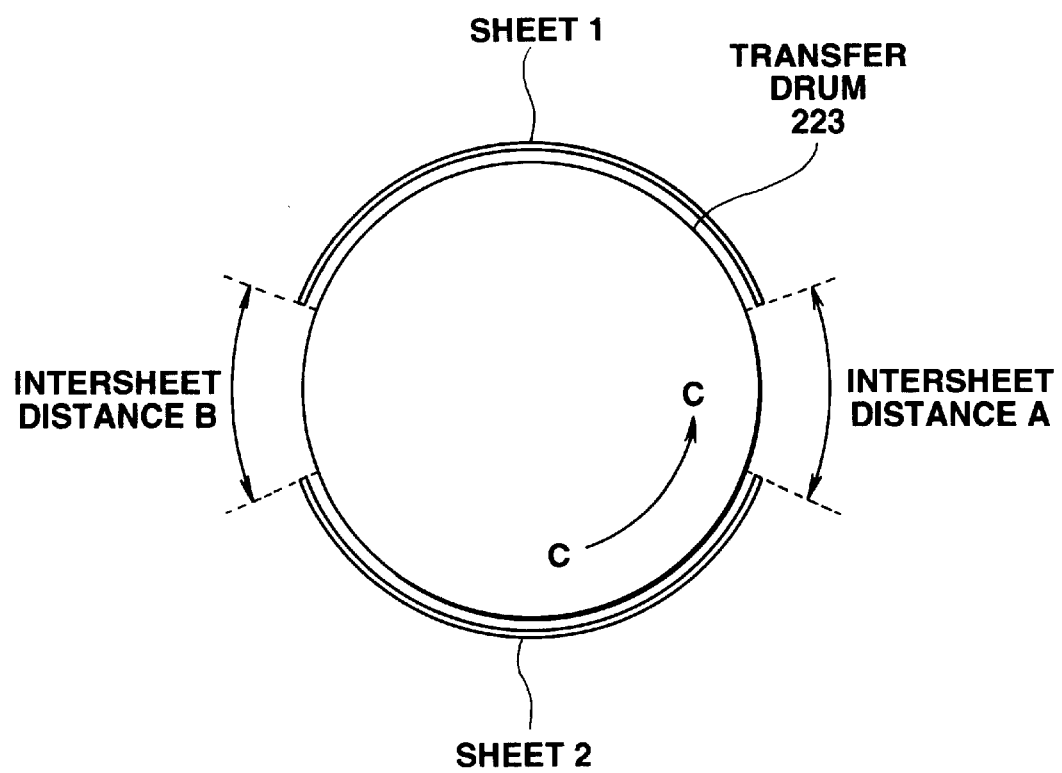
FIG. 12 is a diagram illustrating sheets and intersheet distances on a transfer drum.

FIG. 11 illustrates timing charts for the operations of the image scanner unit 201 and the printer unit 200. The image scanner unit 201 moves the halogen lamp 205 to the position HP-c, performs reading for magenta for original 1 by back scanning (M1B), and stores the read data in the storage medium. The image scanner unit 201 then moves the halogen lamp 205 to the position HP-b, and performs reading for magenta for original 2 by forward scanning (M2F). The printer unit 200 performs image formation using read image data of original 2 (M2). FIG. 12 illustrates the states of recording sheets 1 and 2 corresponding to originals 1 and 2, respectively, wound around the transfer drum 223. As shown in FIG. 12, sheets 1 and 2 are separated with intersheet distances A and B. Image formation for original 2 is performed on sheet 2, and image formation for original 1 is performed on sheet 1. The transfer drum 223 rotates in a direction indicated by an arrow C.

Upon completion of M2F reading, the image scanner unit 201 moves the optical system to the position HP-c. In the printer unit 200, this moving time corresponds to the intersheet distance B between recording sheet 2 for original 2 and recording sheet 1 for original 1. This time is shorter than the reading time. Hence, the optical system must return to the position HP-c at a speed higher than the reading speed.

Then, the image scanner unit 201 performs reading for cyan for original 1 by back scanning (C1B), and stores read data in the storage medium. The printer unit 200 performs image formation for the M1B data stored in the storage medium.

Figure 13:
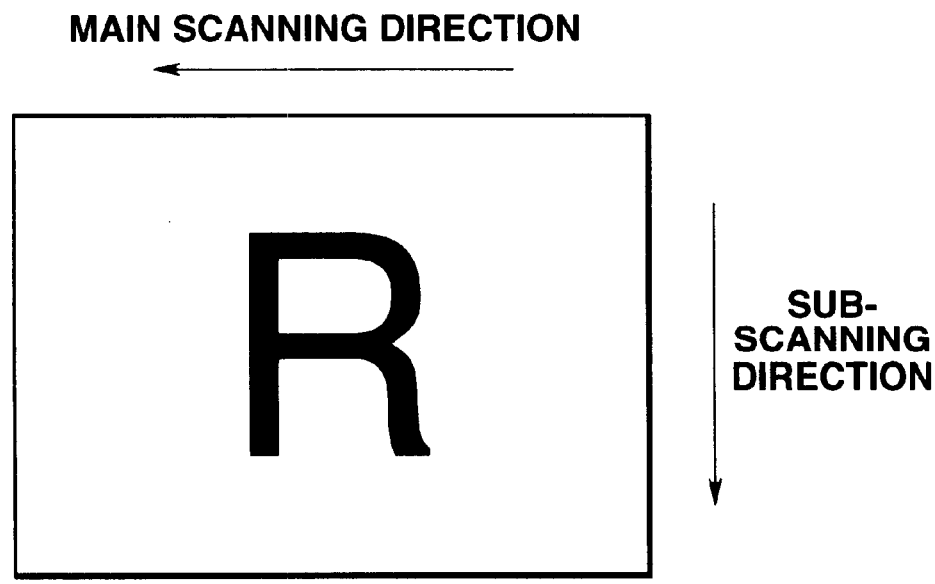
FIG. 13 is a diagram illustrating an image read during forward scanning.
Figure 14:
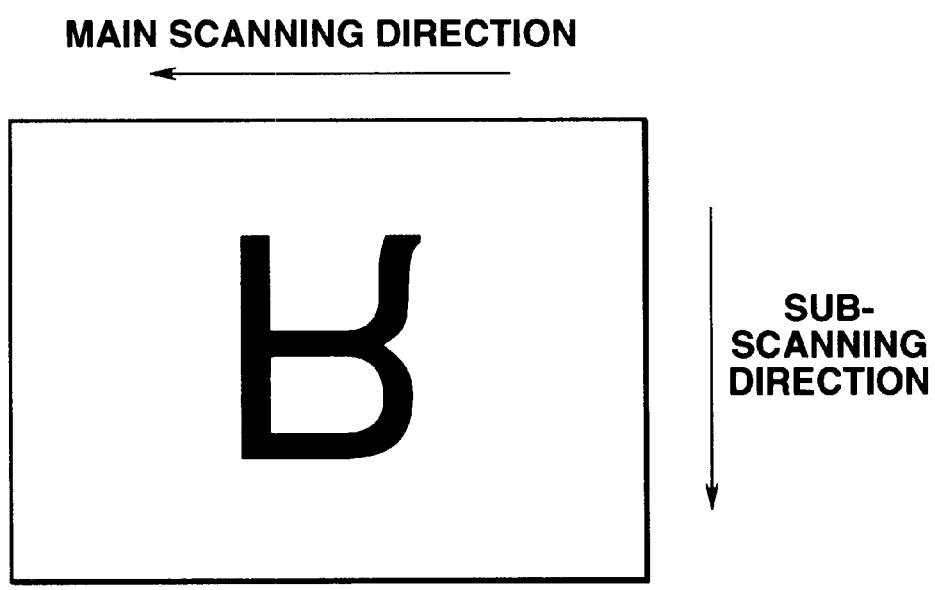
FIG. 14 is a diagram illustrating an image read during back scanning.

Since the image is read by back scanning (in an opposite direction with respect to the sub-scanning direction) in the M1B process, an image as shown in FIG. 14 is read in contrast to an image as shown in FIG. 13 read in ordinary forward scanning. Accordingly, when reading an image stored during back scanning from the storage medium, image data is transferred to the printer unit 200 while performing mirror conversion of the image data in the storage medium. More specifically, as shown in FIG. 15, image data is sequentially written in line memories 1–n of the storage medium for respective lines read in the main scanning direction. When reading the data from the storage medium, the direction of the obtained image can be adjusted to the direction of the image during forward scanning by performing mirror conversion by reading the data starting from the n-th line in a sequence reverse to the sequence during writing.

Upon completion of C1B reading, the image scanner unit 201 moves the halogen lamp 205 to the position HP-b. In the printer unit 200, this moving time corresponds to the intersheet distance A between recording sheet 1 for original 1 and recording sheet 2 for original 2.

Then, the image scanner unit 201 performs reading for cyan for original 2 (C2F) by forward scanning. The printer unit 200 performs image formation using read image data for original 2.

Similarly, at the timing shown in FIG. 11, the image scanner unit 201 performs back-scanning reading for yellow for original 1 (Y1B), forward-scanning reading for yellow for original 2 (Y2F), back-scanning reading for black for original 1 (BK1B), and forward-scanning reading for black for original 2 (BK2F). If at least two originals are present on the original-feeding device (DF) when forward reading of original 2 has been completed, the original-feeding device (DF) conveys two originals onto the original-mount glass 230.

In the printer unit 200, image formation for cyan 1 (C1), image formation for yellow 2 (Y2), image formation for yellow 1 (Y1), image formation for black 2 (BK2), and image formation for black 1 (BK1) are performed.

Upon completion of formation of M, C, Y and BK images on sheets 1 and 2, the sheets are discharged through the fixing unit 226.

By adopting the above-described sequence, originals mounted on the original-feeding device 202 are sequentially read starting from the lowermost original and corresponding images are sequentially formed on sheets, and the sheets having the images are sequentially discharged. Hence, it is unnecessary for the operator to rearrange the discharged sheets.

The above-described copying operation is not performed for the last original when the number of originals is odd, or when only one original is present, or when originals have a size equal to or greater than the A3 size. Instead, a copying operation of reading images by ordinary forward scanning is performed.

It is apparent that the first embodiment may also be applied to a case of copying each page of a bound two-page spread original (page continuous copying), or the like.

As described above, according to the first embodiment, by reading a first original by back scanning, storing read data in a memory, reading a second original by forward scanning, and forming two images corresponding to the first and second originals on a photosensitive drum, it is possible to shorten the copying time.

As described above, one of two originals on an original-mount is read during a forward scanning of an optical unit, the other original is read during a back scanning of the optical unit. Image data corresponding to the original read during back scanning is read in a sequence reverse to the sequence when the image data has been stored in storage means. Accordingly, it is possible to more efficiently perform reading than in a case of not reading an original during back scanning of an optical system when reading two originals, and to provide an erect image by reversing the sequence of reading image data in the form of a mirror image from storage means when performing reading during back scanning.

It is also possible to convey two originals to respective reading positions on an original-mount.

An illuminating unit scans a first original and a second original simultaneously disposed on an original-mount by performing relative movement to the first and second originals. An image corresponding to the first original is borne at forward scanning, an image corresponding to the second original is borne at back scanning, and images corresponding to the borne first and second images are formed on a first recording medium and a second recording medium, respectively. Accordingly, it is possible to scan both the first and second originals on the original-mount at forward scanning and back scanning of the illuminating unit, and to efficiently obtain images.

It is also possible to obtain image data read during back scanning without producing a mirror image.

Since it is possible to simultaneously hold a first recording medium and a second recording medium, it is possible to continuously form images corresponding to simultaneously borne first and second images.

It is also possible to convey a first original and a second original onto an original-mount.

Furthermore, it is possible to skip unnecessary reading during back scanning when only one original is to be conveyed.

Since recording medium 1 and recording medium 2 having images corresponding to a first original and a second original, respectively, are sequentially discharged, it is possible to discharge recording media in the sequence of conveyance of originals.

Other Embodiments

The present invention may be applied to a system comprising a plurality of apparatuses, or to an apparatus comprising a single unit.

A processing method of storing a program for operating the configuration of the first embodiment in a storage medium in order to realize the functions of the first embodiment, and executing the first embodiment in accordance with the program stored in the storage medium also constitutes the present invention, and the storage medium storing the program also constitutes the present invention.

For example, a floppy disk, a hard disk, an optical disk, a magnetooptical disk, a CD(compact disc)-ROM, a magnetic tape, a nonvolatile memory card or a ROM may be used as the storage medium.

The present invention may be applied not only to a case in which processing is executed by only the program stored in the storage medium, but also to a case in which the operation of the first embodiment is executed in an OS (operating system) in cooperation with the function of other software or an expanding board.

The individual components shown in outline or designated by blocks in the drawings are all well-known in the image processing apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
   an optical unit for scanning and exposing at least a first original and a second original disposed side by side on an original mount;
   a driver for causing said optical unit to scan in a first direction and a second direction;
   a sensor for reading a reflected image obtained by said optical unit scanning and exposing the first and second originals;
   a signal processing unit for converting image data read by said sensor into a digital signal;
   a storage medium for storing converted image data; and
   a processor for performing control so that a scanning start position of said optical unit is set at a division portion between the first and the second originals on the original mount, an operation of reading the first original by said sensor is performed during the scanning of said optical unit in the first direction from the scanning start position, converted image data read from the first original by said sensor is stored in said storage medium, and an operation of reading the second original by said sensor is performed during the scanning of said optical unit in the second direction from the scanning start position,
   said processor further for reading out converted image data read from the first original from said storage medium in a sequence reverse to a storage sequence with which the converted image data was stored in said storage medium.

2. An image processing apparatus according to claim 1, further comprising:
   an original-conveying device for conveying the first and second originals to respective positions on the original mount.

3. An image processing apparatus comprising:
   a scanning unit for scanning and reading at least a first original and a second original disposed side by side on an original mount by relative movement of an illuminating unit with respect to the first original and the second original;
   an image bearing member for bearing side by side a first latent image corresponding to the first original and a second latent image corresponding to the second original read by said scanning unit; and an image forming unit for forming a first image corresponding to the first latent image borne by said image bearing member and a second image corresponding to the second latent image borne by said image bearing member on a first recording medium and on a second recording medium, respectively, wherein said image bearing member bears the first latent image corresponding to the first original during a reading operation of said scanning unit at a forward movement from a boundary portion between the first and the second originals with respect to the original mount, and bears the second latent image corresponding to the second original during a reading operation of said scanning unit at a backward movement from the boundary portion between the first and the second originals with respect to the original mount.

4. An image processing apparatus according to claim 3, further comprising a storage medium for sequentially storing an image signal corresponding to the second original read by said scanning unit, wherein said image bearing member bears an image corresponding to the image signal read from said storage medium in a sequence reverse to a storage sequence as the second latent image.

5. An image processing apparatus according to claim 4, wherein said image forming unit comprises a transfer member for simultaneously holding the first recording medium and the second recording medium having the first latent image and the second latent image, respectively, borne on said image bearing member.

6. An image processing apparatus according to claim 4, wherein said scanning unit scans the first original after reading the second original, wherein said image forming unit performs a recording operation on the first recording medium in accordance with the scanning, and records image data stored in said storage medium on the second recording medium while an original conveyed by said original-conveying device onto the original mount instead of the first original and the second original is scanned during a backward movement of said scanning unit, and wherein the first recording medium and the second recording medium are sequentially discharged.

7. An image processing apparatus according to claim 3, further comprising an original-conveying device for conveying the first original and the second original, the second original being disposed on the first original, onto the original mount in a sequence of the first original and the second original.

8. An image processing apparatus according to claim 7, wherein the first recording medium and the second recording medium have sizes so as to be simultaneously held by said transfer member.

9. An image processing apparatus according to claim 7, wherein said original-conveying device is capable of conveying a plurality of originals, and wherein when only one original to be conveyed remains, said scanning unit does not perform a reading operation during a backward movement.

10. A processing method in an image processing apparatus, said method comprising the steps of:

scanning at least a first original and a second original disposed side by side on an original mount by relative movement of an illuminating unit with respect to the first original and the second original;

bearing a first latent image corresponding to the first original at a forward scanning from a boundary portion between the first and the second originals with respect to the original mount, and bearing a second latent image corresponding to the second original at a backward scanning from the boundary portion between the first and the second originals with respect to the original mount; and forming a first image corresponding to the first latent image borne and a second image corresponding to the second latent image borne on a first recording medium and on a second recording medium, respectively.

11. A processing method according to claim 10, further comprising the steps of:

sequentially storing an image signal corresponding to the second original in a storage medium in accordance with the scanning; and in said bearing step, bearing a latent image corresponding to the image signal read from the storage medium in a sequence reverse to a storage sequence as the second latent image.

12. A processing method according to claim 10, further comprising the step of holding the first recording medium and the second recording medium having the first image and the second image, respectively, on a holding unit.

13. A processing method according to claim 12, wherein the first recording medium and the second recording medium have sizes so as to be simultaneously held by the holding unit.

14. A processing method according to claim 10, further comprising the step of conveying the first original and the second original, the second original being disposed on the first original, onto the original mount in a sequence of the first original and the second original.

15. A processing method according to claim 14 wherein, when only one original to be conveyed remains, a reading operation during a backward scanning is not performed.

16. A processing method according to claim 14, further comprising the steps of:

scanning the first original after reading the second original, and performing a recording operation on the first recording medium in accordance with the scanning; and recording stored image data onto the second recording medium while an original conveyed onto the original mount instead of the first original and the second original is scanned during a backward scanning, and sequentially discharging the first recording medium and the second recording medium.

17. An image forming apparatus comprising:

an original mount on which a first original and a second original are capable of being disposed side by side;

an optical unit for scanning and exposing the first original and the second original disposed on said original mount;

an image forming unit for forming a first image and a second image corresponding to the first and the second originals scanned and exposed by said optical unit on a photosensitive member;

a transfer member onto which the first and second images formed on the photosensitive member are transferred, said transfer member comprising an area being capable of transferring the first and the second images side by side with a predetermined gap between the first and the second images;

a scan controller for controlling said optical unit to start scanning and exposing the first original in a first direction from a division position between the first original and the second original, to return to the division position after scanning and exposing the first original, and to scan and expose the second original in a second direction from the division position; and an image forming controller for transferring the first image formed on the photosensitive member onto said transfer member, and sequentially transferring the second image formed on the photosensitive member onto said transfer member so as to be placed at the side of the first image.

18. An image forming apparatus according to claim 17, further comprising a memory for storing image data corresponding to the second original scanned and exposed by said optical unit in the second direction, said image forming unit forming the second image based on the stored image data read out in a sequence reverse to a storage sequence from said memory.

19. An image forming apparatus according to claim 17, wherein said image forming unit forms color images comprised of a plurality of color components.

20. An image forming apparatus according to claim 17, wherein said transfer member further bears a first recording sheet and a second recording sheet, wherein the first and the second images are transferred onto the first and the second recording sheets, respectively.

21. A processing method in an image processing apparatus, the image processing apparatus including an optical unit for scanning and exposing at least a first original and a second original disposed side by side on an original mount, a driver for causing the optical unit to scan in a first direction and a second direction, a sensor for reading a reflected image obtained by scanning and exposing the first and second originals, a signal processing unit for converting image data read by the sensor into a digital signal, and a storage medium for storing converted image data, said method comprising the steps of:

setting a scanning start position of the optical unit at a division portion between the first and the second originals on the original mount;

reading the first original by the sensor during the scanning of the optical unit in the first direction from the scanning start position;

storing to the storage medium converted image data read from the first original by the sensor;

reading the second original by the sensor during the scanning of the optical unit in the second direction from the scanning start position; and reading out converted image data read from the first original from the storage medium in a sequence reverse to a storage sequence with which the converted image data was stored in the storage medium.

* * * * *

UNITED STATES PATENT AND TRADEMARK OFFICE
CERTIFICATE OF CORRECTION

PATENT NO.    : 6,462,843 B2
DATED         : October 8, 2002
INVENTOR(S)   : Junichi Noguchi It is certified that error appears in the above-identified patent and that said Letters Patent is hereby corrected as shown below:

<u>Column 4,</u>
Line 53, "the R." should read -- the R, --.

<u>Column 12,</u>
Line 30, "14" should read -- 14, --.

Signed and Sealed this

Eleventh Day of March, 2003

JAMES E. ROGAN
*Director of the United States Patent and Trademark Office*